Figure 1:
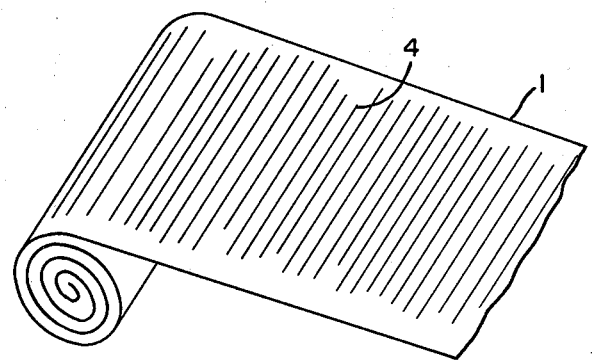

United States Patent [19]

Jaschke et al.

[11] 4,205,107
[45] May 27, 1980

[54] ENDLESS COMPOSITE SHEET MATERIAL

[75] Inventors: Hans Jaschke, Agustin; Rudolf Kautz, Hennef; Hermann Plate, Neunkirchen; Horst Ulb, Troisdorf, all of Fed. Rep. of Germany

[73] Assignee: Dynamit Nobel Aktiengesellschaft, Fed. Rep. of Germany

[21] Appl. No.: 954,077

[22] Filed: Oct. 24, 1978

[30] Foreign Application Priority Data

Oct. 26, 1977 [DE] Fed. Rep. of Germany ....... 2747978

[51] Int. Cl.² .................... B32B 3/00; B27M 1/08; B32B 21/14
[52] U.S. Cl. .................... 428/58; 428/106; 428/345; 428/424.2; 428/425.1; 428/481; 428/511; 428/537; 428/541; 428/483; 428/518; 156/266; 144/309 W
[58] Field of Search .................. 144/309 W; 428/345, 428/349, 541, 511, 106, 479.6, 537, 58, 59, 61, 354, 528, 481, 425, 424, 483, 518; 52/390, 391; 156/265, 266

[56] References Cited

U.S. PATENT DOCUMENTS

| 1,597,538 | 8/1926 | Novotny et al. | 428/541 X |
| 2,070,527 | 2/1937 | Elmendorf | 428/427 |
| 2,834,705 | 5/1958 | Marcucio et al. | 428/345 X |
| 3,231,457 | 1/1966 | Meissner | 428/511 X |
| 3,538,665 | 11/1970 | Gohner | 52/391 |
| 3,740,306 | 6/1973 | Kosbab et al. | 428/349 |
| 3,936,551 | 2/1976 | Elmendorf et al. | 428/106 X |
| 3,969,558 | 7/1976 | Sadashige | 428/106 X |

FOREIGN PATENT DOCUMENTS

| 1037107 | of 1958 | Fed. Rep. of Germany | 428/537 |
| 1334341 | of 1963 | France | 428/57 |
| 4873 | of 1895 | United Kingdom | 428/58 |

*Primary Examiner*—George F. Lesmes
*Assistant Examiner*—Alexander S. Thomas
*Attorney, Agent, or Firm*—Craig and Antonelli

[57] ABSTRACT

A continuous composite sheet material is formed of a genuine wood sheet bonded by a layer of adhesive to a thermally weldable, thermoplastic synthetic resin carrier sheet. This composite sheet is especially useful as a covering for a profiled structure used in furniture construction or interior decoration.

3 Claims, 7 Drawing Figures

ENDLESS COMPOSITE SHEET MATERIAL

This invention relates to an endless, i.e. continuous, composite sheet material made up of a carrier sheet or film of a synthetic resin and a decorative wooden cover sheet, and to a process for the manufacture of such a composite sheet material and the advantageous use thereof in the production of wooden veneered rigid structures.

It is desirable in many instances to line, laminate, or encase structures made of simple wooden materials, chipboards, etc., with a genuine wood veneer, i.e. an outer wooden covering. It is known to laminate structural components for the furniture industry, such as, for example, shelf boards, bed frames, drawers, etc., with genuine wood veneers, by covering the individual areas successively by the use of the edge gluing method. Moreover, it is known to utilize imitations of genuine wood veneer formed of synthetic resin films or sheets for the endless encasing of profiled articles and boards, etc. In these conventional encasing or covering processes, for example for frames and chipboard panels, a hard PVC sheet, e.g. provided with decorative wood prints, is utilized as an endless covering sheet or web in a continuous operation; the sheet having an imitation wood grain extending in the longitudinal direction of the sheet. In such processes, the sheet is grooved in accordance with the outer edges of the structural components to be encased so that here the sheet can be wrapped without bulging around the components. Initially, the components are coated on the outside with a dispersion adhesive, for example, and the endlessly fed sheet is then pressed against the components by means of rolls. After setting of the adhesive, a firm bond is thus established and an encased structural component is the finished article. Such a continuous encasing method for structural components cannot be executed with the use of genuine wood veneers since there are no genuine wood veneers in the form of such endless webs or sheets. The genuine wood veneers are also limited with respect to their lengths in the direction of the wood grain in each case by the length of the tree trunk from which the veneers are formed.

The present invention is based on the problem of providing an endless composite sheet material or laminate having a genuine wood veneer covering wherein the wood grain of the veneer extends in the longitudinal direction of the endless composite material, so that the material can be utilized for the endless covering of structural components and profiled elements, preferably for furniture manufacture and interior decoration.

The invention solves the above problem of providing an endless composite material made up of a carrier sheet of a synthetic resin and a decorative sheet by means of a genuine wood sheet bonded via a layer of adhesive to a heat-weldable or heat-sealable thermoplastic synthetic resin carrier sheet. Furthermore, the grain direction of the genuine wood sheet extends preferably in the longitudinal direction of the composite material.

Such a composite sheet material is characterized in accordance with the invention in that it is produced from individual cut-to-size sections which have been joined and welded together at junction zones. Preferably, the junction zones have a serrated shape. Since the genuine wood sheet is not heat-sealable in the junction zones, a further development of the invention provides an adhesive which can be activated in a high-frequency field as the adhesive layer. In this way, in case of carrier sheets welded together by high frequency, it is possible to effect at the junction zones of the composite sheet material simultaneously a bonding together of the genuine wood sheet along the edges at the junction zone due to the activation of the adhesive.

Thus, in accordance with the invention, a genuine wood sheet is applied to a carrier sheet of a synthetic resin and can now be used in this form for the endless covering of chipboard profiles, etc. However, this also makes it now possible to manufacture endless structural components covered by genuine wood in one piece in an endless encasing process, rather than merely achieving wood imitations on the basis of synthetic resin sheets, namely in the form of prints.

The process of this invention for the manufacture of an endless composite sheet material with a carrier sheet of a synthetic resin and a decorative sheet is characterized in that a genuine wood sheet is used as the decorative sheet and is bonded by means of an adhesive to a heat-sealable carrier sheet to form a first composite sheet material; thereafter cut-to-size sections are produced from this first composite sheet material; and the cut-to-size sections are joined continuously along the edges extending at right angles to the grain direction of the genuine wood sheet to form a second endless composite sheet material and the junction zones are welded together thermally, for example by means of high frequency or heat impulse. In this connection, the invention is based on the use of a genuine wood sheet known, for example, as microfine wood sheet or microwood sheet and produced by the peripheral paring of tree trunks. The tree trunks are cut to a length of 1 to 1.3 m, and then peripheral pared around, whereby fine grained wood like birch or anga is pared to the thinnest sheets of about 100 microns thickness, middle grained wood like macore, mansonia, walnut-tree or maple wood is pared to sheets having a thickness of about 150 to 250 microns and rough grained wood like oak can only be pared to sheets having a thickness between 200 and 300 microns. In these wooden sheets, the wood grain extends at right angles to the longitudinal extension of the high-quality wood sheet obtained by paring. The width of the genuine wood sheet is dependent on the length of the tree trunk being pared. Such an endless microwood sheet or genuine wood sheet is unsuitable for the endless covering of profiled elements, since the wood grain is at right angles to the longitudinal extension of the sheet and thus the bending of the sheet in the longitudinal extension required for the covering step cannot be executed since such bending would take place transversely to the grain and the wood would splinter. It is, therefore, necessary to produce a microwood composite sheet panel having a grain direction in parallel to the longitudinal extension of the sheet panel. According to the invention, the genuine wood sheet is, for this purpose, first applied to a carrier sheet of a weldable thermoplastic synthetic resin with the aid of a layer of adhesive promoter. It would be possible, in this connection, to apply the genuine wood sheet to the carrier sheet in cut-to-size lengths corresponding to the width of the carrier sheet, already rotated by 90° in the plane of the surface area, so that the grain direction of the genuine wood cuts already extends in the longitudinal direction of the sheet web. To obtain a flawless junction of the grain at the connecting points of the cut, every second cut would have to be rotated additionally by 180° in the longitudinal direction. However, there still would be the further problem of closing the junction gaps flawlessly in the region of the genuine wood. Therefore, the genuine wood sheet is preferably joined to the carrier web in a continuous operation wherein the grain direction extends initially at right angles to the longitudinal extension of the composite board. From this initial composite sheet, cut-to-size sections having the desired dimensions are then produced which join continuously into an endless composite sheet material wherein the grain direction of the genuine wood sheet is in the longitudinal extension and are then bonded seamlessly (i.e. without a raised ridge or seam) and without the addition of welding agents or further adhesives by the action of heat along the junction zones. In this process, the junction zones are homogeneously bonded, namely by welding together of the carrier sheet, and a completely smooth junction of the cut-to-size sections is achieved without overlapping, bead, or groove. In this way, it is possible by way of the carrier sheet to produce genuine wood sheets in endless composite webs or sheets wherein the grain direction of the wood extends in parallel to the longitudinal extension of the web or sheet.

Since the sections of the genuine wood sheet cannot be directly bonded together in the region of each junction, a further development of the invention provides to attain at this region an additional adhesive effect by adhesive forming the adhesive layer. Therefore, an adhesive which can be activated in a high-frequency field, especially a dispersion adhesive, for example based on polyvinylacetate, like typ 183 of Hellmithinwerke, Pirmasens, West-Germany is preferably utilized which is, during the welding together of the carrier sheet, simultaneously activated by high frequency, and the thus-activated adhesive is pressed by the welding pressure in trace amounts also into the junction gaps of the adjacent sections of the genuine wood sheet, gluing the sections together along the edges. However, the adhesive must not expand to such an extent that it protrudes on the surface of the composite sheet material. Preferably, the two mutually opposed edges of the cut-to-size sections, extending at right angles to the grain direction of the genuine wood sheet, are serrated or dovetailed, and the edges of the cut-to-size sections are joined together. A homogeneous bond is attained by welding the carrier sheet together in the junction zone, wherein the resultant continuous genuine wood sheet layer is seamlessly and smoothly embedded by means of the adhesive. A genuine wood sheet of microwood having a thickness of 0.1–0.3 mm preferably 0.1–0.15 mm is utilized for the invention. As adhesive one component adhesives for example on the basis of polyurethane, nitrile rubber, polyvinylacetate, or polyester which can be activated by applying heat may be used in form of a solution, an aqueous dispersion or a melting adhesive. A solution adhesive is for example the neoprene adhesive typ 3150 of Dr. Kurt Herberts, West Germany and a polyurethane adhesive is for example. Ultraflex 56 of Isar-Rakoll Comp. West Germany; a melting polyester adhesive is Dynapol 1228 of Dynamit Nobel AG, Troisdorf. In the first process, the genuine wood sheet is applied by means of an adhesive, to the carrier sheet, for example by means of a continuous application method, passing through a pair of rolls. The application of the adhesive can take place either directly prior to the bonding of the carrier sheet to the genuine wood sheet, or it can have been applied already in a preceding operating step to one of the sheets and the bonding process is then initiated later, for example by heat activation. The thickness of the layer of adhesive is maintained at a relatively low value, preferably between 0.01 and 0.1 mm. Preferred materials for the carrier sheet are thermoplastic, weldable synthetic resins on the basis of polyvinyl chloride, preferably hard PVC or durable PVC, acrylonitrile-butadiene-styrene, polystyrene, polyethylene terephthalate, polycarbonate, polyamide, styrene-acrylonitrile copolymers, wherein the sheet has a thickness of about 0.1–0.8 mm., preferably 0.1–0.4 mm.

According to the process of this invention, cut-to-size sections having a specific predetermined length are cut from the composite sheet formed from the carrier sheet and genuine wood sheet, wherein the grain direction still extends at right angles to the longitudinal extension of the composite sheet; these sections are rotated in their plane by 90° and then preferably serrated along the edges extending at right angles to the grain direction, whereupon they are joined by interlocking. It has been known in the wood and veneer technique to serrate veneers of solid wood and then join same to obtain the continuous patterns, but this is impossible to do with the genuine wood sheets utilized in the present invention, due to their minor thickness and the resultant lack in rigidity and inherent dimensional strength. Only by the composite established with the carrier sheet does it become possible in accordance with the invention to serrate even these genuine wood sheets, and then to join same to the desired endless composite sheet material. A flawless junction seam is obtained by the thermal welding step with the use of high frequency or heat impulse on the carrier sheet; normally, the serrated edges of the genuine wood sheet are additionally glued together by the activation of the adhesive layer during the welding step. A high frequency arrangement of 12 kw applying pressure of 10–14 kg/cm$^2$ to effect bonding for a welding time of about 2 sec has been found sufficient to receive good bonding results. The endless composite sheet material produced in this way according to the invention can then be grooved likewise along the continuous longitudinal extension thereof on the side of the carrier sheet, to ensure in this way a flush contact on the corners of profiled elements during the endless covering operation.

A preferred application of the endless composite sheet material produced according to the invention, with an outer genuine wood sheet layer, the grain of which likewise extends in the longitudinal direction of the composite sheet material, is the endless covering of panels or profiled elements, such as chipboards, preferably for furniture construction and/or housing interior decoration.

The invention is illustrated in one embodiment in the drawings and will be explained in greater detail below with reference thereto.

Figure 5:
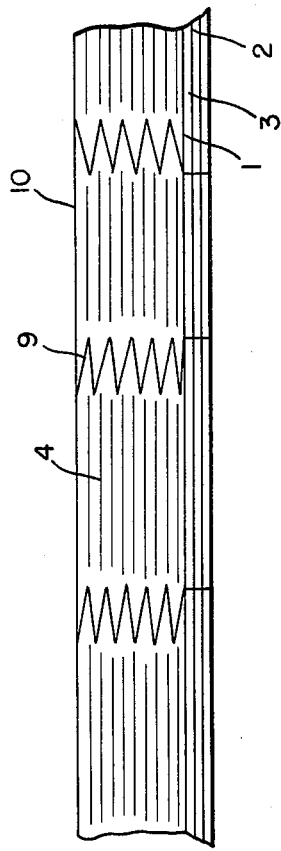
Figure 6:
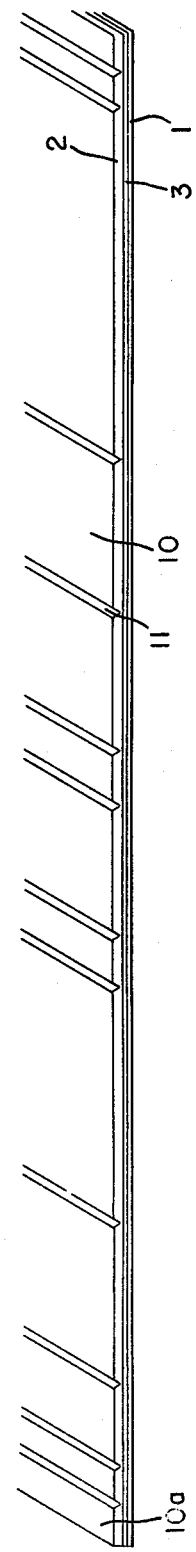
Figure 7:
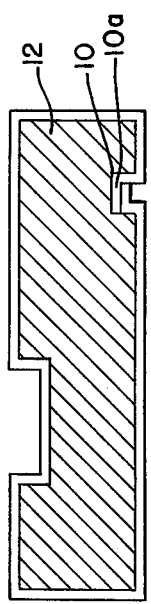

In the drawings:

FIGS. 1–5 show schematically the individual steps for producing the endless composite sheet material, and FIGS. 6 and 7 show a practical example of processing the endless composite sheet material for the encasing or covering of a profiled element.

Figure 2:
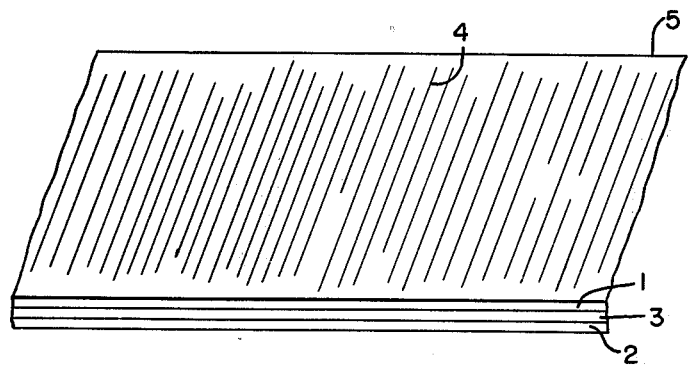
Figure 3:
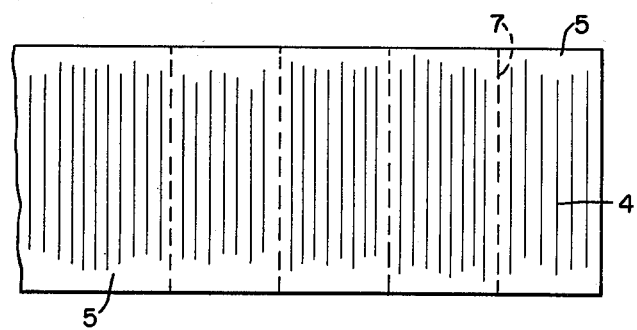
Figure 4:
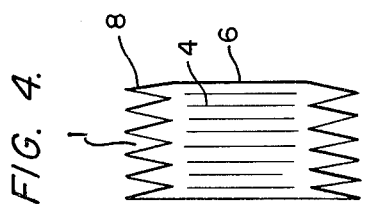

FIG. 1 illustrates a genuine wood sheet 1 formed as a so-called microfine wood or microwood sheet by the paring method. The width of the genuine wood sheet is dependent on the trunk length of the pared wood and is usually from 1 to 1.3 meters. The grain direction 4 extends at right angles to the longitudinal extension of the sheet 1. With the use of such a genuine wood sheet 1 as shown in FIG. 1, it is impossible to encase profiled (i.e. shaped) elements, chipboards or the like by means of a continuous method since the genuine wood sheet cannot be bent in the longitudinal direction, inasmuch as then the wood sheet would splinter on account of the transversely extending grain 4. Therefore, in a first process step, the genuine wood sheet 1 is joined to a carrier sheet 2 of suitable synthetic resin with the use of an adhesive layer 3 to obtain the composite sheet 5, as illustrated schematically in FIG. 2. This composite sheet 5 is not as yet suitable, either, for purposes of an endless covering operation, since here, too, the grain direction 4 still extends at right angles to the longitudinal extension of the composite sheet. This composite sheet 5 is now subdivided or cut width-wise into sections 6, as illustrated in FIG. 3, in a subsequent process step, for example along the cutting lines 7. These cut-to-size sections 6 are now serrated, in the next process step, along the two edges running at right angles to the grain direction 4, as can be seen from FIG. 4, for example. In this connection, it should be noted that the genuine wood sheet 1 alone cannot be serrated, since it does not exhibit adequate rigidity and inherent strength. Only by the use of the composite sheet shown in FIG. 2 is it possible to effect serrating or dovetailing. The teeth 8 in FIG. 4 can also have a different configuration. Moreover, it is also possible, instead of serrating or dovetailing the individual cut sections 6, to serrate or dovetail already the composite sheet 5 before it is subdivided into sections along its edges extending at right angles to the grain direction 4. The serrated cut sections 6 are now rotated in their plane by 90° and continuously joined together, as illustrated in FIG. 5. The junction zones 9 are then thermally welded without any further addition of auxiliary welding agents, wherein a weld seam is obtained which does not have a bead. Especially suitable proves to be the use of high-frequency welding or heat impulse welding. The tooth edges 8 are homogeneously joined along the junction zone 9 without foreign materials, and a completely smooth junction without overlapping is thus achieved. At the junction zone, the carrier sheet 2 is welded together while the adhesive layer 3 is activated, and trace amounts of the adhesive are pressed under the pressure of the welding element into the gaps of the genuine wood teeth. At this point, an endless composite board 10 has been obtained wherein the grain direction 4 of the genuine wood sheet extends in the longitudinal direction of the composite board. This composite board 10 can now be utilized for the endless covering of profiled elements, since it can be bent in the longitudinal extension of the composite sheet material, which is now in parallel to the grain direction 4. The composite sheet material 10 can also be rolled up, since sufficient suppleness is provided by the carrier material 2, and the genuine wood sheet is thereby likewise prevented from splintering.

FIG. 7 shows the profiled element 12 in a cross-sectional view, forming, for example, a drawer frame. The profiled element 12 consists of a simple chipboard which is now to be provided with a covering of genuine wood. The composite board 10 is utilized for this purpose. While FIGS. 1-5 show the manufacture of the composite board 10 in a schematic view and on a reduced scale, FIGS. 6 and 7 illustrate a substantially larger scale coming close to the actual scale. The composite sheet material 10 is provided, for the endless covering of the profiled element 12, with the grooves 11 on the side formed by the carrier sheet 2, in correspondence with the individual edges or corners of the profiled element 12. These grooves 11 run in parallel to the grain direction 4 in the longitudinal extension of the composite sheet material 10. After grooving the composite sheet material 10, the material is fed to the profiled element 12 by way of roller systems and pressure rolls and placed around the profiled element 12. The adhesive bonding between profiled element 12 and composite board 10 can take place, for example, again with the aid of an adhesive, with which the profiled element 12 has previously been coated on the outside. In FIGS. 6 and 7, the starting portion 10a of the composite sheet material has been indicated, so that the profiling of the composite sheet material 10 intended for the covering step can be observed. It now becomes possible with the aid of the composite material proposed by the present invention to encase or cover profiled members, panels, etc. by means of the endless method with a genuine wood sheet veneer layer, so that products of versatile usage are obtained which heretofore could not be manufactured in this way.

What is claimed is:

1. A continuous composite sheet material which comprises a plurality of individual cut-to-size sections bonded together, each of said sections comprising a carrier sheet of a thermally weldable thermoplastic synthetic resin and a decorative genuine wood sheet having a thickenss of about 0.1–0.3 mm, the decorative genuine wood sheet being joined to the carrier sheet by a layer of an adhesive which can be activated in a high-frequency field, said plurality of individual, cut-to-size sections being bonded together at junction zones formed therebetween to provide a continuous decorative wood sheet extending in the longitudinal direction of the composite sheet material, said junction zones being formed along interlocking edges provided between each adjacent section and each of the genuine wood sheets having a grain direction that extends in the longitudinal direction of the composite sheet material; each genuine wood sheet being microwood; the thermoplastic synthetic resin sheet being an ABS resin, polystyrene, polyethylene terephthalate, polycarbonate, polyamide, styrene-acrylonitrile copolymer or polyvinyl chloride and having a thickness of 0.1–0.5 mm; and the adhesive layer being formed of polyurethane, nitrile rubber, polyvinyl acetate, or a polyester and having a thickness of 0.01–0.1 mm.

2. A composite sheet material according to claim 1, wherein said composite sheet material is a supple material capable of being rolled up in the longitudinal direction without splintering of the genuine wood sheets.

3. A composite sheet material according to claim 1, wherein the junction zones are formed along serrated edges provided into each of the adjacent sections.

* * * * *